United States Patent
Huang

[11] Patent Number: 6,041,539
[45] Date of Patent: Mar. 28, 2000

[54] AERODYNAMIC FISHING LURE UTILIZING DEFLECTABLE LIP

[76] Inventor: Shian-Tsen Huang, 3438 Irwin Ave., Bronx, N.Y. 10463

[21] Appl. No.: 08/942,212

[22] Filed: Oct. 1, 1997

[51] Int. Cl.$^7$ .................................................. A01K 85/00
[52] U.S. Cl. ........................................ 43/42.22; 43/42.47
[58] Field of Search ............................... 43/42.03, 42.22, 43/42.47, 42.09

[56] References Cited

U.S. PATENT DOCUMENTS

| | | | |
|---|---|---|---|
| 1,542,404 | 6/1925 | Paulson | 43/42.22 |
| 1,600,653 | 9/1926 | Steenstrup | 43/42.47 |
| 1,602,329 | 10/1926 | Bonnett | 43/42.47 |
| 1,606,176 | 11/1926 | Paulson | 43/42.22 |
| 2,494,384 | 1/1950 | Gadzinski | 43/42.22 |
| 2,538,171 | 1/1951 | Stroup | 43/42.47 |
| 3,815,275 | 6/1974 | Amundson | 43/42.22 |
| 4,215,507 | 8/1980 | Russell | 43/42.22 |
| 4,697,378 | 10/1987 | Tunstall | 43/42.22 |
| 4,807,387 | 2/1989 | Dougherty, Jr. | 43/42.22 |
| 5,337,508 | 8/1994 | Pfeiffer | 43/42.22 |
| 5,351,433 | 10/1994 | Ellis | 43/42.22 |

*Primary Examiner*—Kurt Rowan
*Attorney, Agent, or Firm*—Alfred M. Walker

[57] ABSTRACT

An aerodynamic fishing lure utilizing an air deflectable lip which enables a swimming lure to be cast for a longer distance and greater accuracy without adding weight, by reducing air resistance and deflection, that are associated with an ordinary rigid non-deflectable lip. The aerodynamic fishing lure includes a lure body and an air deflectable lip assembly made up of a stationary lip, a pivotal pin, and a moving air deflectable lip. The air deflectable lip pivots and folds forward forming a streamlined configuration to the lure body when the lure is being cast during the process of fishing. Once the lure enters the water, the air deflectable lip extends open to function like an ordinary non-deflectable rigid lip to create resistance underwater, causing the lure to wobble from side to side mimicking a live baitfish.

3 Claims, 3 Drawing Sheets

AERODYNAMIC FISHING LURE UTILIZING DEFLECTABLE LIP

BACKGROUND OF THE INVENTION

A conventional prior art swimming lure imitates a lifelike swimming action via a rigid non-deflectable lip located at is lower front part. The purpose of the non-deflectable lip is to create resistance underwater causing the lure to wobble from side to side while mimicking a live baitfish. The rigid lip also creates air resistance and deflection that adversely affects the castability of the prior art during the process of fishing.

OBJECTS OF THE INVENTION

The object of the aerodynamic fishing lure of the present invention utilizing an air deflectable lip is to enable a swimming lure to be cast for longer distance and greater accuracy in the air without adding weight that otherwise would hamper the lure's swimming action under the water.

SUMMARY OF THE INVENTION

The aerodynamic fishing lure consists of a lure body and an air deflectable lip assembly made up of three components: the stationary lip, the pivotal pin, and the moving lip. The air deflectable lip folds vertically forward while the lure is cast in the air, forming a streamlined configuration in conjunction with the lure body which results in less air resistance and less deflection while the lure is being cast during the process of fishing. Once the lure enters the water, the air deflectable lip extends open and functions just like the rigid lip of the prior art which is to create resistance underwater causing the lure to wobble from side to side mimicking a live baitfish.

REFERENCE NUMERALS USED IN THE DRAWINGS

Figure 1:
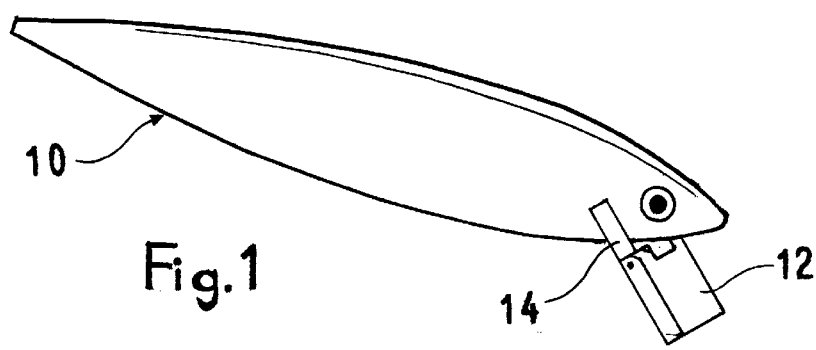
FIG. 1 is a side elevational view of the aerodynamic fishing lure of the present invention utilizing an air deflectable lip with the deflectable lip extended.

The following reference numerals refer to the various components of the fishing lure with a deflectable lip of the present invention:

10—lure body.
12—thick moving lip.
14—thick stationary lip.
15—pivotable arm.
15a—pivot hole.
15b—rounded edges of arms 15
16—pivotal pin for the thick deflectable lip assembly.
17—recess.
18—thin moving lip.
19—pivotable arm.
19a—pivotable holes.
20—pivotal pin for the thin deflectable lip assembly.
21—joggle bend extension.
22—thin stationary lip.
24—moving lip for the deflectable lip using a thin flexible sheet as the pivotal point.
26—thin flexible sheet.
28—stationary lip for the deflectable lip using a thin flexible sheet as the pivotal point.

DETAILED DESCRIPTION OF THE INVENTION

FIG. 1 illustrates an aerodynamic fishing lure utilizing a deflectable lip with the air deflectable lip in the extended position in which the thick stationary lip 14 is both attached to the lure boy 10 and is connected to the an air deflectable thick moving lip 12 by a hinged pivotal pin 16.

Figure 2:
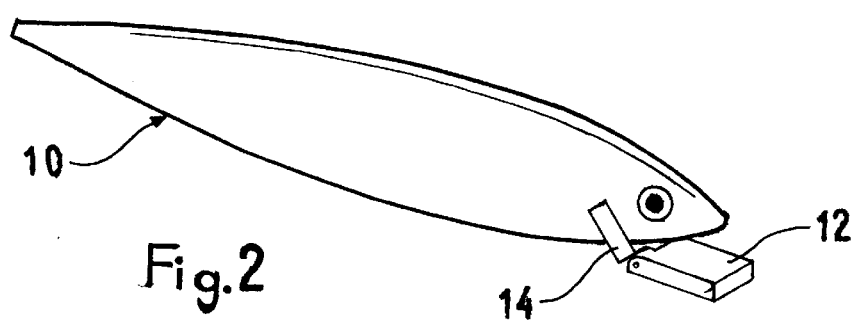
FIG. 2 is a side elevational view of the aerodynamic fishing lure of the present invention utilizing the air deflectable lip, showing the lip deflected and folded vertically forward in a vertical plane.

When the lure is being cast during the process of fishing, it travels tail first. FIG. 2 demonstrates the air deflectable thick moving lip 12 pivoting and folding vertically forward, in a vertical plane forming a streamlined configuration to the lure body 10, and parallel to the longitudinal axis of the lure body 10, thus reducing air resistance, which means that there is an increased casting distance and also greater accuracy due to less deflection. Once the lure enters the water, the deflectable lip extends open, as shown in FIG. 1, and functions just like the rigid lip of the prior art, which functions to create resistance underwater, causing the lure to wobble from side to side, mimicking a live baitfish.

Figure 3:
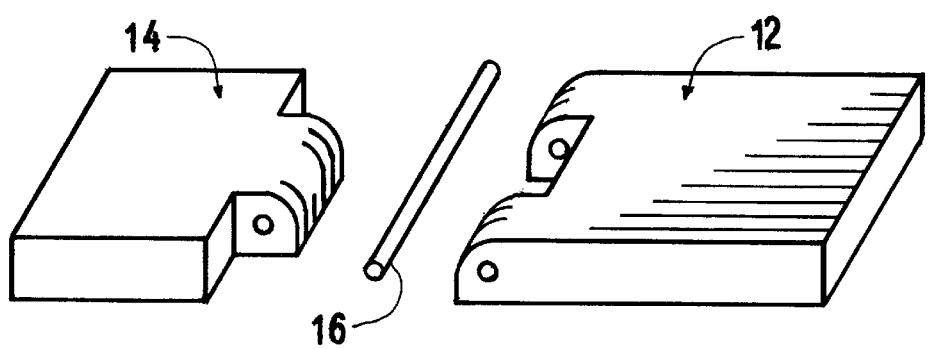
FIG. 3 is an enlarged close up view of the air deflectable lip components, made of a thick material.
Figure 5:
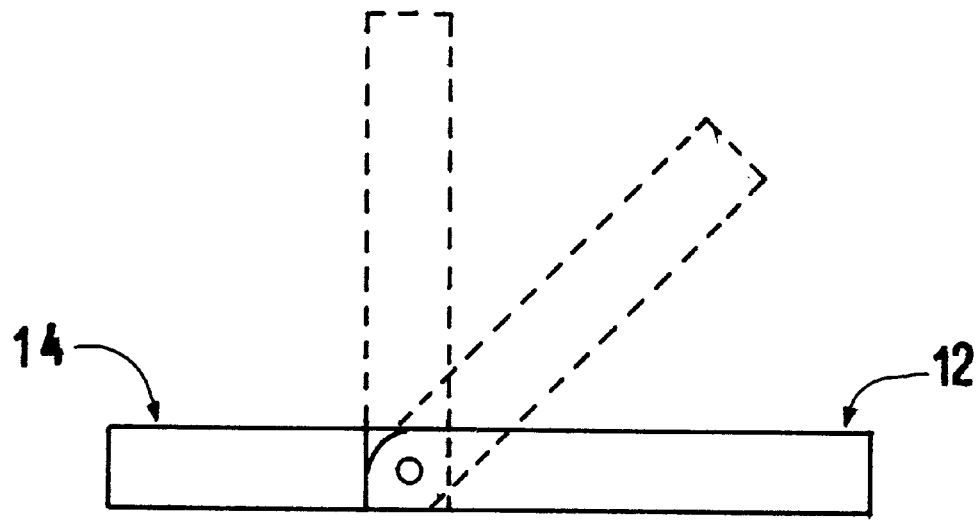
FIG. 5 is a side elevational view that shows the thick deflectable lip at different vertically forward positions in a vertical plane.

The mechanics of the deflectable lip can be better understood by referring to FIG. 3. FIG. 3 shows that lips 12 and 14 are connected by pivotable pin 16 which is insertable within at one or more holes 15a of one or more pivotable arms 15. The pivotal arms 15 fit within one or more recesses 17 adjacent to the pivotal arms 15. The top edges 15b of pivotal arms 15 are rounded where the thick stationary lip 14 connects to the thick moving lip 12 by the pivotal pin 16. The thick moving lip 12 is permitted to fold and pivot vertically forward in a vertical plane along the direction of the rounded edges but is prevented from folding the other way pass the extended position due to the unrounded bottom edges. FIG. 5 demonstrates the thick moving lip 12 at different positions.

Figure 4:
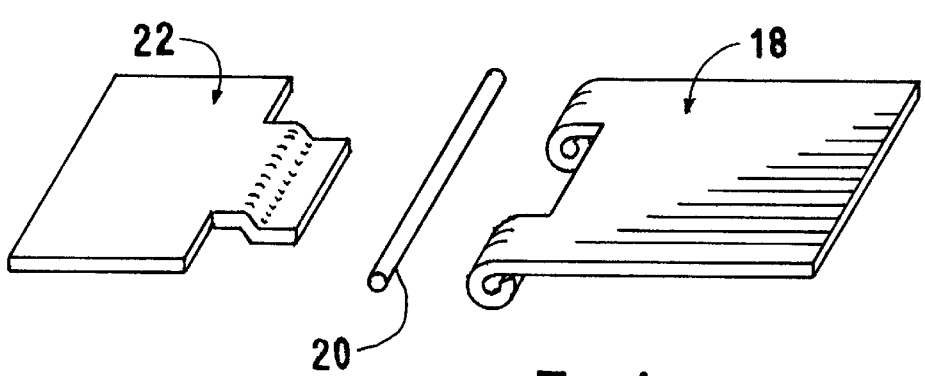
FIG. 4 is an enlarged close up view of the air deflectable lip components, made of a thin material.
Figure 6:
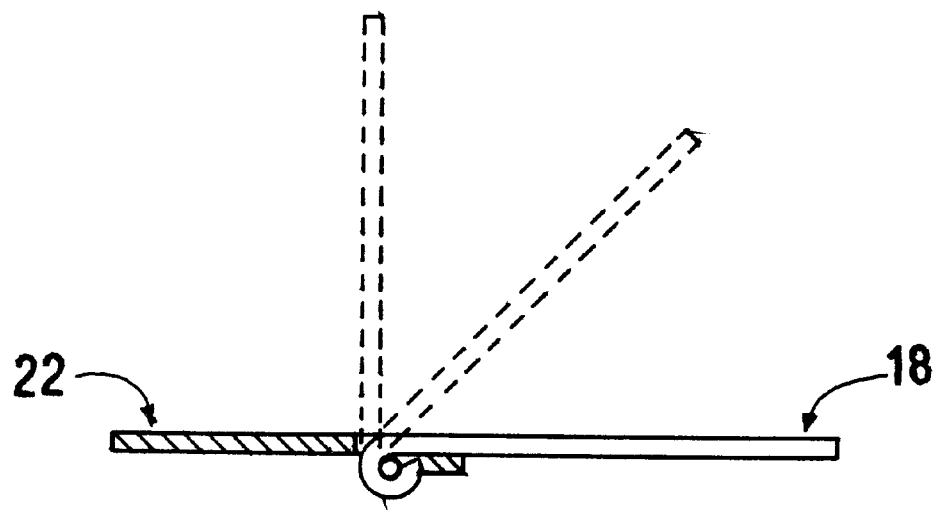
FIG. 6 is a side elevational view that shows the thin deflectable lip at different vertically forward positions in a vertical plane.

When the construction of a thin deflectable lip using the aforementioned design is not practical, a different approach is shown in FIG. 4. The thin stationary lip 22 has a joggle bend that allows the attachment of the pivotal pin 20 which in turn connects the thin moving lip 18. As shown in FIG. 4, one or more pivotal arms 19 fit adjacent to joggle bend extension 21, wherein pivot pin 20 is inserted within one or more pivot holes 19a of pivotal arms 19 and adjacent to an underside of joggle bend extension 21, thereby connecting moving lip 18 and stationery lip 22. The joggle bend extension 21 of the thin stationary lip 22 permits the thin moving lip 18 to fold only one way but not the other way past the extended position. FIG. 6 demonstrates the thin moving lip 18 at different positions.

Figure 7:
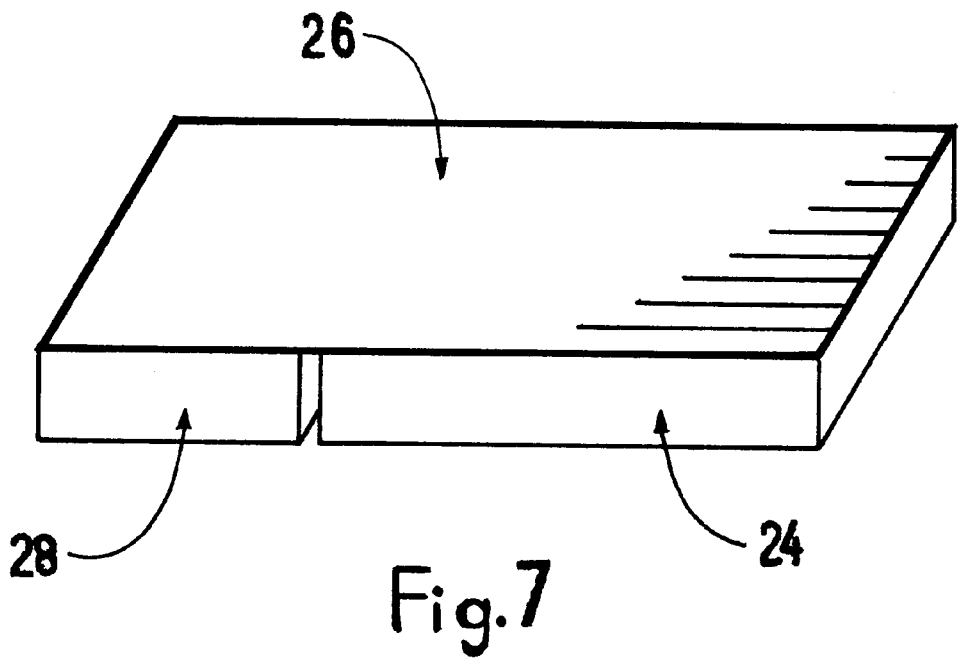
FIG. 7 is an enlarged perspective view of the air deflectable lip assembly using a thin flexible sheet as the pivotal point, wherein the moving air deflectable lip pivots vertically forward in a vertical plane.
Figure 8:
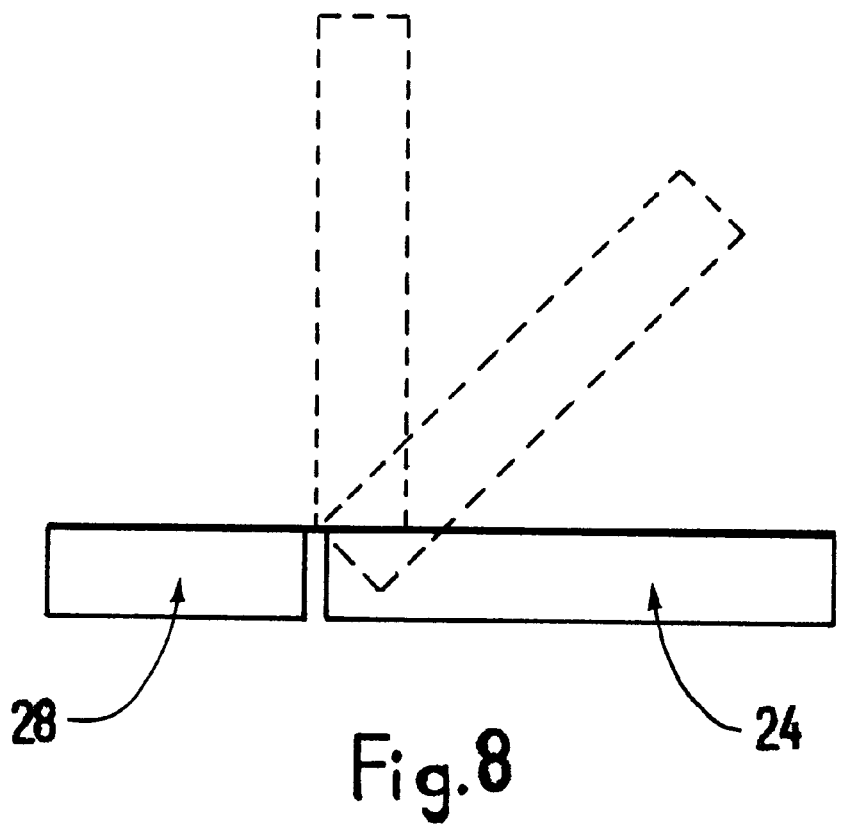
FIG. 8 is a side elevational view that shows the different positions of the deflectable lip assembly using a thin flexible sheet as the pivotal point.

Another variation of the deflectable lip design is shown in FIG. 7 where a thin flexible sheet 26 functions both as a pivotal point and a connection for the stationary lip 28 and the moving lip 24. FIG. 8 shows the moving lip 24 using a thin flexible sheet 26 as the pivotal point at different vertically forward positions in a vertical plane.

It is further noted that other modifications may be made to the present invention without departing from the scope of the invention, as noted in the appended claims.

I claim:

1. An aerodynamic fishing lure utilizing a deflectable lip, comprising a moving air deflectable lip having a recess and at least one pivotable arm;

said at least one pivotable arm having a pivotal hole and a rounded edge extending radially from said at least one pivotable arm;

a stationary lip having at least one further recess and one further pivotable arm; said further pivotable arm having a further pivotal hole extending coterminous with said pivotal hole;

said further pivotable arm having a rounded edge;

a lure body being attached to said stationary lip;

said recess and said at least one pivotable arm of said moving air deflectable lip and said at least one further recess and said one further pivotable arm of said stationary lip being movably meshed together;

a pivotal pin being inserted in said pivotal hole and said further pivotal hole; and said rounded edge of said pivot able arm of said moving air deflectable lip rotating in said at least one further recess of said stationary lip, permitting movement of said moving air deflectable lip to align in a parallel manner a longitudinal axis of said moving air deflectable lip with a longitudinal axis of said lure body when the lure is cast.

2. An aerodynamic fishing lure utilizing a deflectable lip, comprising a moving air deflectable lip having one recess and at least one pivotable arm; said at least one pivotable arm having a pivotable hole;

a stationary lip having at least one recess and a joggle bend extension; said joggle bend extension having a downward first bend extending from said stationary lip and an outward second bend extending below said downward first bend;

a lure body being attached to said stationary lip;

said at least one pivotable arm, said one recess of said moving air deflectable lip being movably meshed together with said at least one recess and said joggle bend extension of said stationary lip;

a pivotal pin being inserted in said pivotable hole and said pivotal pin being secured under said downward first bend of said joggle bend extension with said outward second bend extending under said moving air deflectable lip;

said outward second bend of said joggle bend extension acting as a stop permitting movement of said moving air deflectable lip to align in a parallel manner a longitudinal axis of said moving air deflectable lip with a longitudinal axis of said lure body when the lure is cast.

3. An aerodynamic fishing lure utilizing an air deflectable lip, comprising a moving air deflectable lip having a thin flexible sheet on one surface;

a stationary lip having said thin flexible sheet on a corresponding surface;

a lure body being attached to said stationary lip;

said moving air deflectable lip and said stationary lip being abutted together;

said thin flexible sheet connecting said moving air deflectable lip and said stationary lip; and, said flexible sheet acting as a hinge, permitting movement of said moving air deflectable lip to align in a parallel manner a longitudinal axis of said moving air deflectable lip with a longitudinal axis of said lure body when the lure is cast.

* * * * *